United States Patent [19]

Jégo et al.

[11] Patent Number: 4,668,035
[45] Date of Patent: May 26, 1987

[54] DISTRIBUTION SYSTEM AND COLUMN FOR ELECTRIC SWITCHING APPARATUS

[75] Inventors: Gérard Jégo, Brazey en Plaine; Jean-Pierre Thierry, Couternon; Serge Verdenne, Marcilly sur Tille, all of France

[73] Assignee: La Telemecanique Electrique, France

[21] Appl. No.: 810,124

[22] Filed: Dec. 18, 1985

[30] Foreign Application Priority Data

Dec. 20, 1984 [FR] France ................................ 84 19536

[51] Int. Cl.⁴ ............................................ H01R 25/16
[52] U.S. Cl. ............................ 339/22 B; 200/50 AA; 361/338
[58] Field of Search ................. 339/21 R, 21 S, 22 R, 339/22 B, 22 T; 361/335, 336, 338, 341, 342, 343, 347, 355, 361, 350, 391; 200/50 AA, 50 R

[56] References Cited

U.S. PATENT DOCUMENTS

| | | | |
|---|---|---|---|
| 3,067,402 | 12/1962 | Thaw | 339/92 |
| 3,217,211 | 11/1965 | Norden | 361/338 |
| 3,634,810 | 1/1972 | Pemberton | 339/278 C |
| 4,032,209 | 6/1977 | Rutkowski | 339/91 R |
| 4,502,097 | 2/1985 | Takahashi et al. | 361/342 |
| 4,531,174 | 7/1985 | Rickmann | 200/50 AA |

*Primary Examiner*—Neil Abrams
*Attorney, Agent, or Firm*—William A. Drucker

[57] ABSTRACT

A distribution system and column for electric switching apparatus is provided comprising a distribution column with bus bars and a protective case disposed about the bars, a plurality of supports which extend laterally to the case and which have at least one bearing wall applicable to a respective fixing face of the case. Each support is adapted to carry at least one switching apparatus and a current tapping and disconnecting member having clips clippable on the distribution bars through traps provided in a side of the case, said member comprises means for connection to the switching apparatus and a manually actuatable mobile disconnection part.

13 Claims, 10 Drawing Figures

DISTRIBUTION SYSTEM AND COLUMN FOR ELECTRIC SWITCHING APPARATUS

BACKGROUND OF THE INVENTION

The present invention relates to a distribution system for electric switching apparatus, this system comprising a distribution column having vertical non coplanar busbars and a protective case disposed about the bars. It also relates to the distribution column appropriate to such a system.

For electric switching apparatus, is meant here apparatus such as contactors, circuit breakers, circuit makers-breakers, protective apparatus or switches properly speaking comprising poles for opening and/or closing the power circuit fed from the above mentioned distribution busbars.

It is desirable to associate with electric distribution columns having bars situated in different vertical parallel planes, systems for fixing and connecting electric switching apparatus which allow such apparatus to be mounted conveniently and taking up little space in depth while offering the possibility of disconnecting and resetting with every safety the electric connection between the distribution busbars and the apparatus.

SUMMARY OF THE INVENTION

The aim of the present invention in particular is to provide compact fixing and disconnectable electric connection of switching apparatus to a distribution column comprising non coplanar busbars.

It also provides a simple and particularly accessible system in which the control of the disconnection and of resetting may be blocked by mechanical detection of the "on" state of the switching apparatus.

In accordance with the invention, in a system of the abovedescribed type, a plurality of supports are provided which extend in a direction parallel to the planes of the bars, each support comprising at least one bearing wall which may be applied to a respective fixing face of the protective case of the column and being adapted for supporting on the one hand, at least one switching apparatus and, on the other, a current tapping and disconnecting member having clips clippable on the distribution bars by insertion through traps provided in one side of the case perpendicular to the planes of the bars, the current tapping and disconnecting member comprising means for connection to the switch apparatus and a mobile disconnecting part adapted to be actuated by manual control means.

The arrangement described and particularly the arrangement of the removable disconnecting member between the side of the case protecting the set of bars and the switching apparatus in association with a support common to said member and to apparatus, allow a system to be formed with lateral extensions; this system therefore takes up little room in depth and allows easy fitting and wiring, as well as good accessibility to the apparatus and to their associated disconnecting blocks.

Preferably, the system described comprises supports, each of which comprises at least one switching apparatus and one associated disconnecting member in the form of a block fixed to the support; the supports are disposed like so many horizontal branches either unilaterally on one side of the case perpendicular to the planes of the bars, or bilaterally on two such opposite sides of the case; fixing flanges are further provided on the case parallel to the planes of the bars for fitting the supports by frontal presentation, application against the flanges and fixing thereto by means of centering and locking pieces, these pieces being integral with the support or the case and cooperating with apertures formed in the fixing flanges of the case of respectively of the support.

Preferably, the support comprises a fixed portion with respect to the case of the column and a portion adjustable in depth with respect to the fixed portion for fitting switching apparatus of different types and dimensions using the same support and within the same frontal pattern. Thus modular apparatus may be fixed if required on a vertical or horizontal rail, or on several such rails, fixed to the adjustable portion of the support.

For facilitating the work of the operator, a disconnection plate may be associated with the disconnecting block and integral with the support or with the disconnecting block for providing the desired interaction between this latter and the switching apparatus, this plate being provided with a sensor movable parallel to the planes of the bars for detecting the position of a member such as a button or hand lever representative of the state of the switching apparatus. The plate may in addition be adapted for comprising means for manually controlling the disconnection, fixed or for example formed by a key.

When the manual disconnection control means comprise a key, the plate has an aperture with slits for introducing the key and a rotary cylinder for housing the key and driving a shaft controlling the disconnection; the cylinder has at least one bearing surface adapted for cooperating with a stop on the sensor for being locked against rotation by the stop as soon as the sensor detects that the switching apparatus is in a closed position. The plate may finally comprise elements indicating the disconnected or reset state of the disconnection block, these elements being very simply disposed on the rotary cylinder so as to appear in a window of the plate.

There may be further provided in the current tapping and disconnection member a prebreak device associated with the switching apparatus and responsive to the movement of the plate or preferably to a member moved during actuation of the manual disconnection control means.

The invention also provides the distribution column adapted for receiving the modular supports of the above described system.

BRIEF DESCRIPTION OF THE DRAWINGS

One embodiment of the invention will be described here by way of non limitative example with reference to the accompanying drawings in which.

DESCRIPTION OF THE PREFERRED EMBODIMENTS

Figure 1:
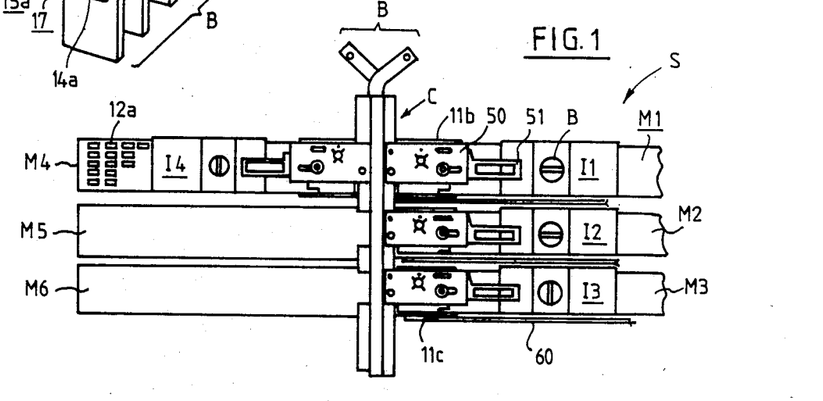
FIG. 1 shows, in front elevation, an electric distribution system in accordance with the invention.

The system S shown in FIG. 1 is associated with a distribution column C comprising coplanar busbars B1 to B5 parallel to the same plane P in a protective case E.

The system shown is designed for fixing and electrically connecting switching apparatus I, for example contactors, circuit breakers, circuit makers-breakers or switches properly speaking, with which may be possibly associated auxiliary devices not shown such as protective devices, fuses, remote control devices. System S comprises supports forming modules M; FIG. 1 shows several supports M1-M6 disposed bilaterally with respect to the column on both sides thereof.

Each support or module M has a generally elongate shape and comprises a fixed portion 11 and a platen 12 adjustable in depth, i.e. perpendicularly to the planes of the bars, with respect to the fixed portion (FIGS. 2, 3 and 4); it also comprises as required at least one bracket 13 increasing the depth adjustment range, this bracket being fixed to the platen 12 (FIG. 4); with apparatus of different depths, the platen 12 allows a housing pattern situated behind a plane P1—P1 (FIG. 4) to be kept corresponding for example to a door of a cabinet housing the described distribution system. Brackets 13 may for example support vertical or horizontal rails themselves supporting modular switching apparatus and their accessory parts (FIG. 3).

The platen 12 is preferably a steel section or chassis having a standardized perforations 12a in a web 12b bordered with flanges 12c, 12d; it is provided on its flanges 12c, 12d with fixing holes 12e for passing therethrough screws which also pass through adjustment orifices, for example in the form of button holes 11a, formed in an upper horizontal wall 11b of the fixed support 11.

Figure 4:
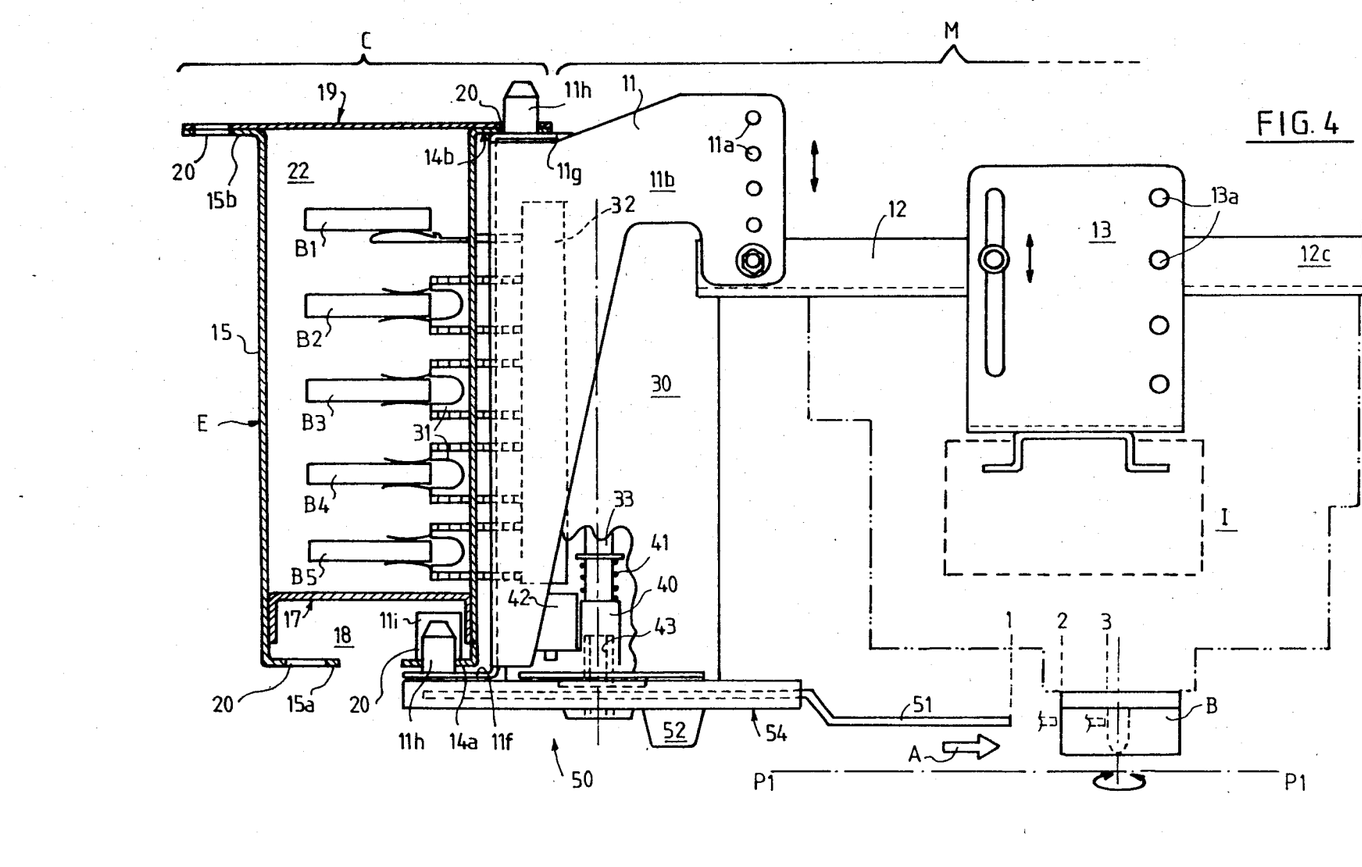
FIG. 4 is a partial top view on a larger scale of the support of FIG. 2.

In the embodiment shown in FIG. 4 bracket 13 has apertures 13a corresponding with apertures 12e in the platen so as to provide depth adjustable fixing of the bracket 13 by means of screws engaged in said apertures, thus allowing modular switching apparatus of smaller depth than apparatus I to be fixed to the support.

Figure 3:
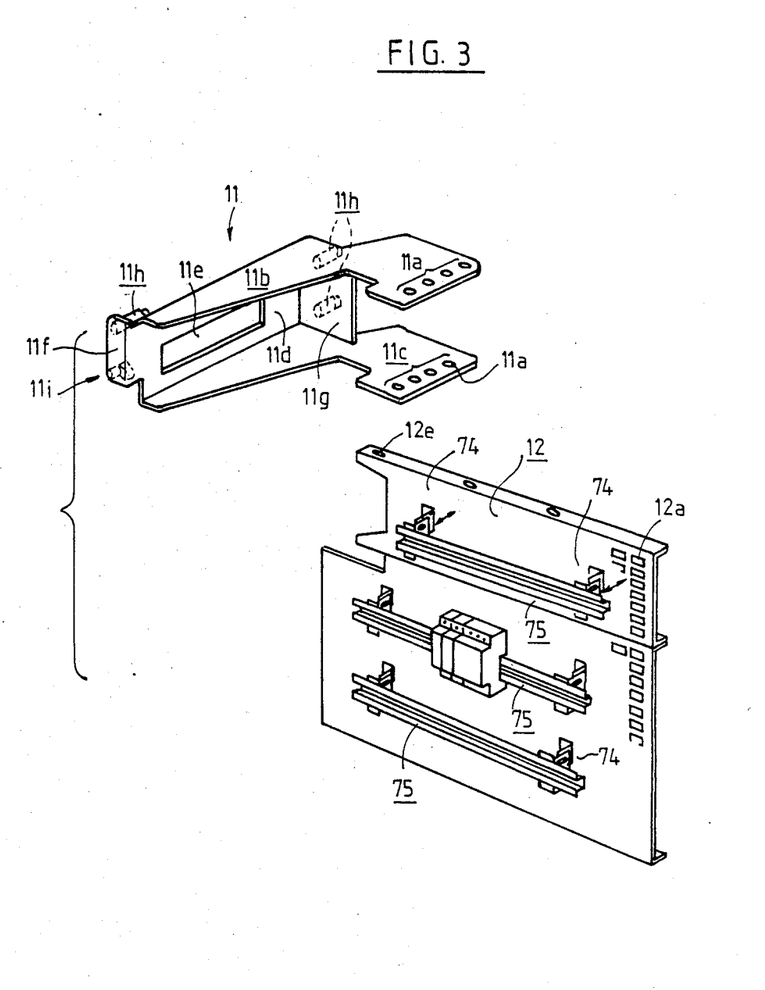
FIG. 3 shows in a smaller scale perspective view the fixed part of the support of FIG. 2, as well as a variant of the adjustable part of the support secured to its fixed portion.

In the embodiment shown in FIG. 3, platen 12 has a vertically developed surface for supporting, by means of frontally fixed telescopic lugs 74, several horizontal rails 75 for supporting modular apparatus.

The fixed support 11, best seen in FIG. 3, has an upper horizontal wall 11b and a lower horizontal wall 11c comprising the above mentioned button holes 11a for adjusting the platen 12. Walls 11b, 11c are joined together by a vertical web 11d having an opening 11e for placing opposite a trap formed in a side of the column for passing therethrough blades or clips for clipping onto bars B1-B5.

The fixed support 11 comprises a front wall 11f and a rear wall 11g for fixing to the case E of column C. Walls 11f, 11g are vertical and are joined at right angles to the vertical web 11d; wall 11f is equipped with a tenon 11h and a locking piece 11i of any type, for example of a quarter turn type. Wall 11g has two tenons 11h; the tenons 11h have truncated cone shaped ends for suitable guiding in housings of the case E.

The protective case E for column C contains the busbars B1-B5. It comprises (FIGS. 2 and 3) two opposite vertical sides 14, 15 perpendicular to plane P—P and each one having traps 16 for passing therethrough connection clips proper to each support M. To each of the vertical sides 14, 15 are fixed a front bent flange 14a, 15a and a rear bent flange 14b, 15b. A channel section 17 is fixed to the inner side of case E to the internal faces of the vertical walls 14, 15 so as to form set back from flanges 14a, 15a a chamber 18, whereas a flat piece 19 is fixed to the rear of flanges 14b, 15b for closing the chamber 22 of bars B1-B5. Flanges 14a, 14b, 15a, 15b are parallel to the plane P—P and are provided, at regular intervals h corresponding to the fixing pitch of the modular supports, with apertures 20 for passing therethrough the tenons 11h and with apertures 21 for passing the locking pieces 11i therethrough. It will be readily understood that the supports M are engaged horizontally on the column from the front, i.e. in a direction perpendicular to plane P—P and to the planes of the busbars B1-B5, so that the tenons 11h and the locking pieces 11i penetrate into the respective apertures 20, 21 of flanges 14a, 14b, 15a, 15b. The sides 14, 15 of case E may advantageously have projections 72, obtained for example by stamping, for serving as a support for support 11 and facilitating the positioning thereof. Bars 5 are five in number but may of course be smaller in number. Bars B1-B5 correspond to the conductors of a three phase electric network with distributed neutral and protective conductor. In another method of construction, the protective conductor may be formed by the case E itself when this latter is made from an electrically conducting material, or by means of a protective conductor fixed to the case when this latter is made from an insulating material. This latter construction will be described further on with reference to FIG. 10.

The current tapping and disconnecting member is a block 30 secured in the fixed support 11 by fixing means, but it could of course itself form this fixed support and/or be formed of a current tapping and disconnecting member. The vertical web 11d of the fixed support 11 may be fixed to the side 14 of case E.

Block 30 is molded from an insulating material and has current tapping clips 31 which may be clipped onto the busbars B1-B5 and unclipped therefrom by the translational movement of a simple disconnecting slide 32 controlled by a rotary shaft 33; the clips 31 are housed individually in compartments formed in slide 32.

Block 30 further has fixed means for connection for example by means of screws with power terminals of the switching device I. The control of the translational movement of the slide takes place in response to the rotation of shaft 33 through at least one movement transformation connection, for example of the rack and pinion type.

Figure 5:
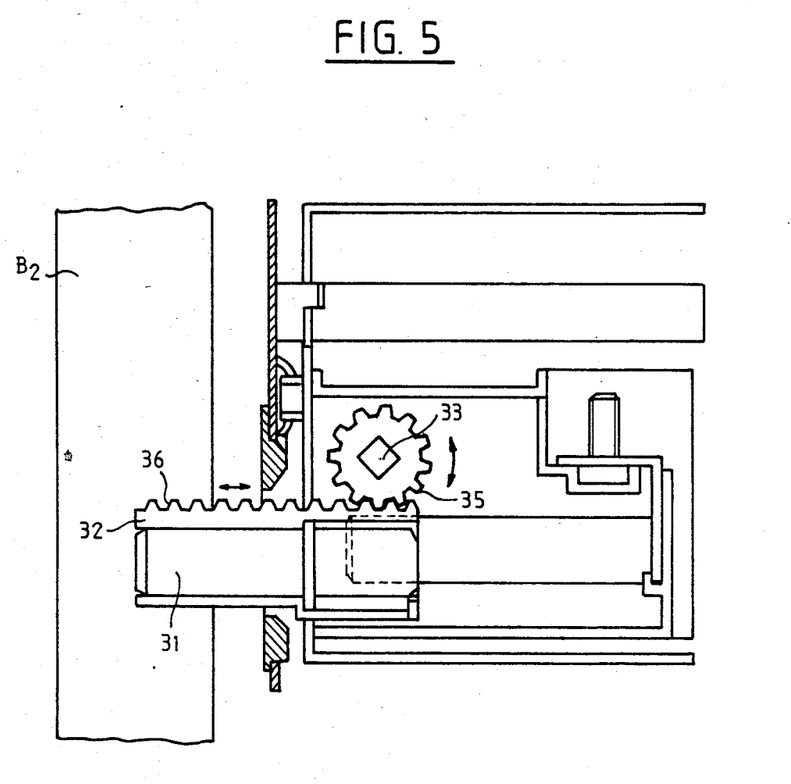
FIG. 5 shows in front elevation a rack and pinion connection between the rotary shaft controlling the disconnection and the portion movable in translation of the current tapping and disconnecting member.

FIG. 5 shows this type of connection with the pinion 35 mounted on the rotary shaft 33 and meshing with the rack 36 formed on the upper face of slide 32, so as to transform the rotational movement of the shaft into a translational movement of the slide; in FIG. 5, clip 31 is shown in the position clipped onto the busbars B2 for example.

Of course any other appropriate member may be used for forming the disconnectable current tapping member, for example by means of pivoting clips.

The rotation of shaft 33 is caused by means of a key not shown whose impression may pentrate into an appropriate housing 43 in a cylinder 40 fixed to the shaft (FIG. 4). This cylinder 40 may be guided axially along shaft 33 and be urged towards a disconnecting plate 50 by a spring 41, so as to be able to move slightly backwards with respect to shaft 33 when the disconnection control key is introduced so as to actuate a contact 42 associated with the switching device I for making sure that breaking takes place off load.

Of course, as disconnection control means there may also be provided a lever or flywheel permanently disposed but able to be inhibited by the plate and to control a prebreak device directly at the beginning of the disconnecting movement.

The disconnection plate 50 is fixed for example by snap fitting on the front face of the disconnection block 30 or of the fixed support 11.

Figure 8:
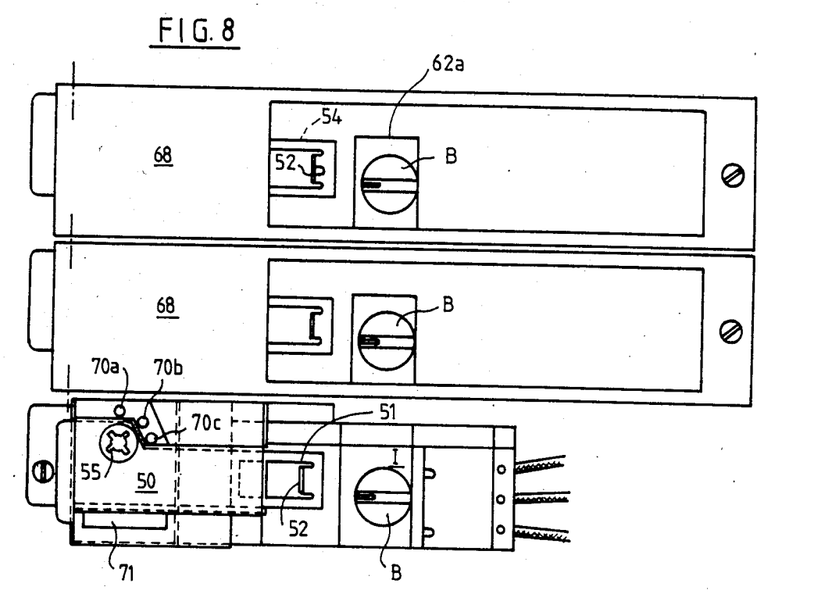
FIG. 8 shows in elevation the partitioned supports of the type shown in FIG. 7, the partitioning being removed from the lower support so as to show the disconnecting or isolating plate.
Figure 9:
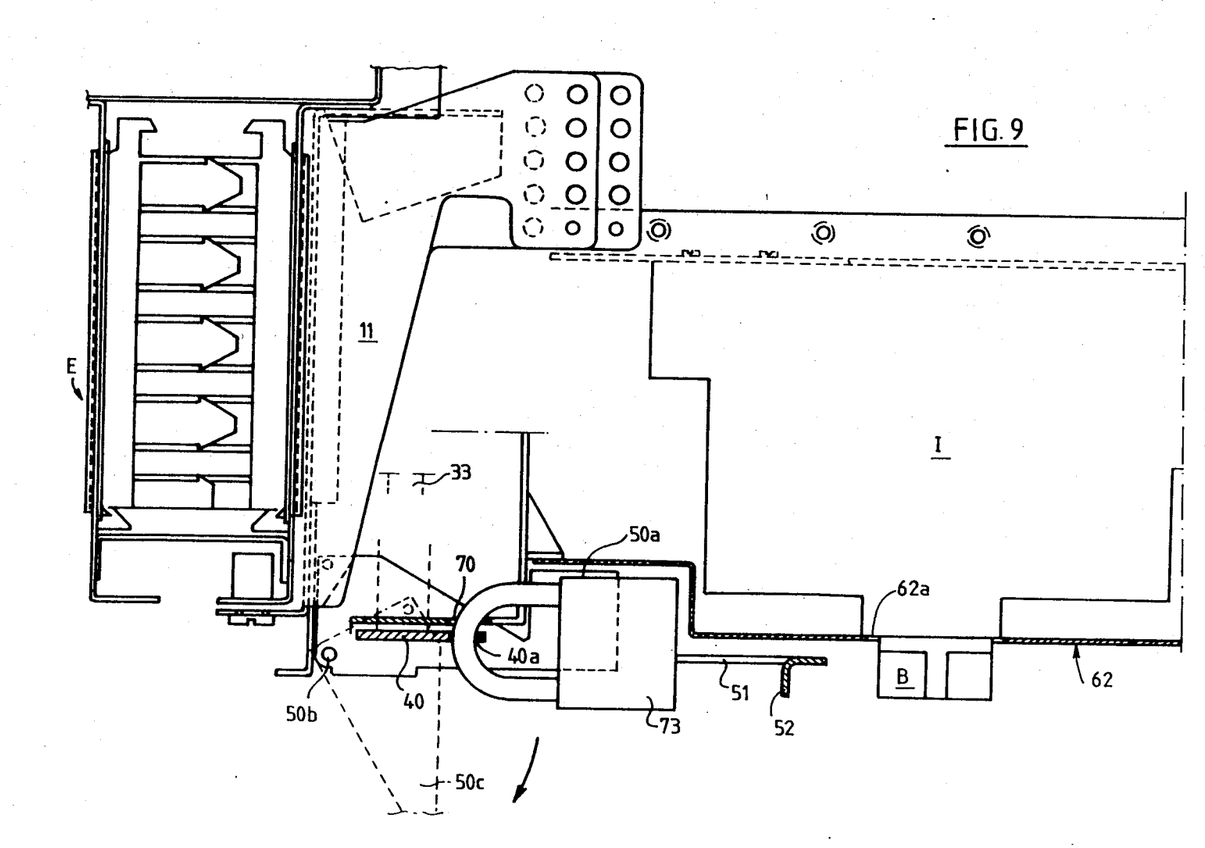
FIG. 9 is an enlarged top view of the support of FIG. 7.

This plate 50 comprises (FIG. 4) a sensor 51 movable manually parallel to the plane P1—P1 in the direction of an arrow A against the force of a return spring not shown. The sensor is housed and guided in the plate, while being provided with a manual operating member. This member is for example an operating button 52 passing through an oblong window 53 in the plate (FIGS. 2 and 6) or a grip 52 formed by a bend in the sensor (FIGS. 8 and 9). The free end of the sensor may thus be brought from the rest position 1 to the "on" or "off" detection position 2 or to the detection position 3 for sensing the "break", "tripped" or "open" state of the position taken by button B of the switching apparatus I. Sensor 51 has in addition a stop, not shown, cooperating with a bearing surface, for example a cam 44 of the cylinder 40 for preventing disconnection and reclipping when the sensor can only come into position 2.

A rotary detection may of course also be provided. Sensors 51 of different shapes may be provided in association with switching apparatus of different dimensions and/or switching apparatus equipped with buttons or levers adapted differently.

The front face of the plate has furthermore an aperture with slits 55 for introducing the key controlling the disconnection and resetting, an indication window 56 opposite which comes in indication "0" or "1" carried by a face interlocked for rotation with shaft 33, for example the front face of the cylinder 40, and an oblong window 57 adapted to coincide with a corresponding window in the cylinder for padlocking or locking shaft 33 in its disconnection position.

Figure 6:
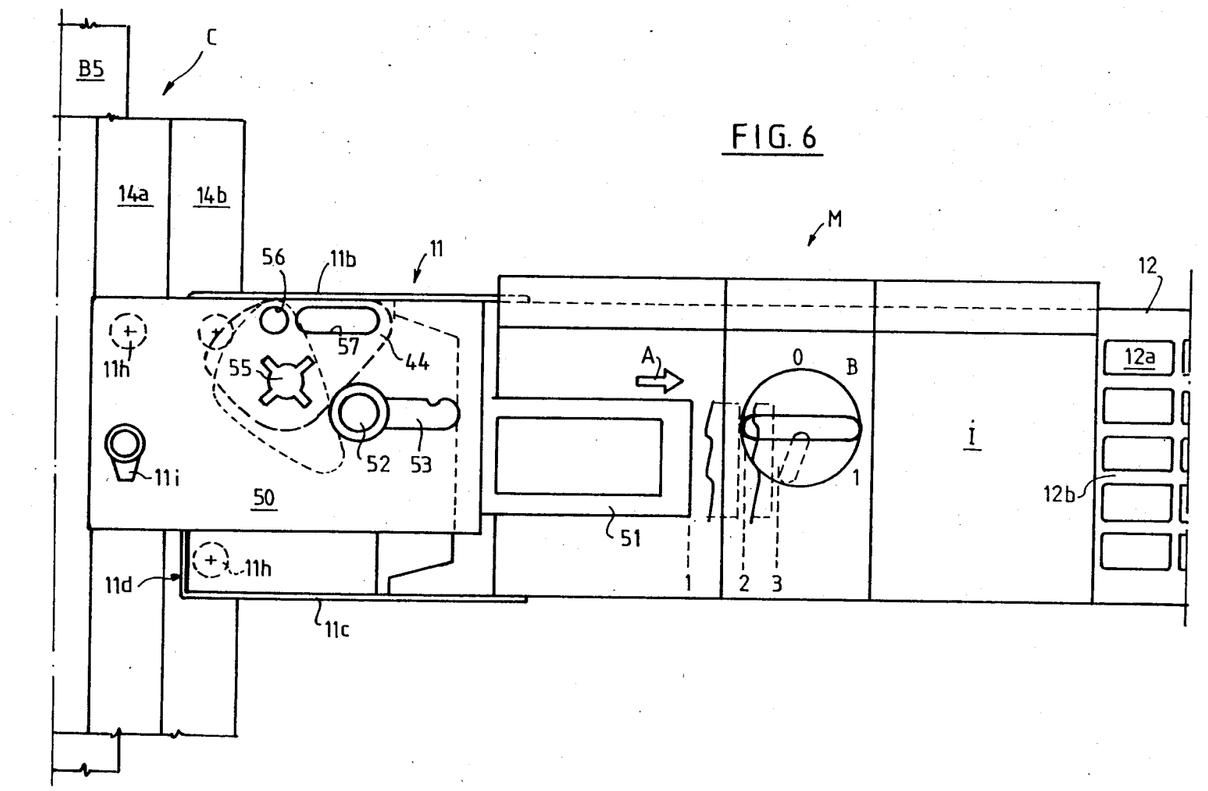
FIG. 6 is an elevational view of the same support as shown in FIG. 2.

Cam 44 has been illustrated in FIG. 6 with continuous lines in its disconnection position and with broken lines in its reset position. The shape of the key and of aperture 55 ensure that the key can only be inserted and withdrawn in the two "disconnected" and "reset" positions by rotating a quarter of a revolution for going over from one to the other while preventing the key from being withdrawn in its intermediate position.

Figure 2:
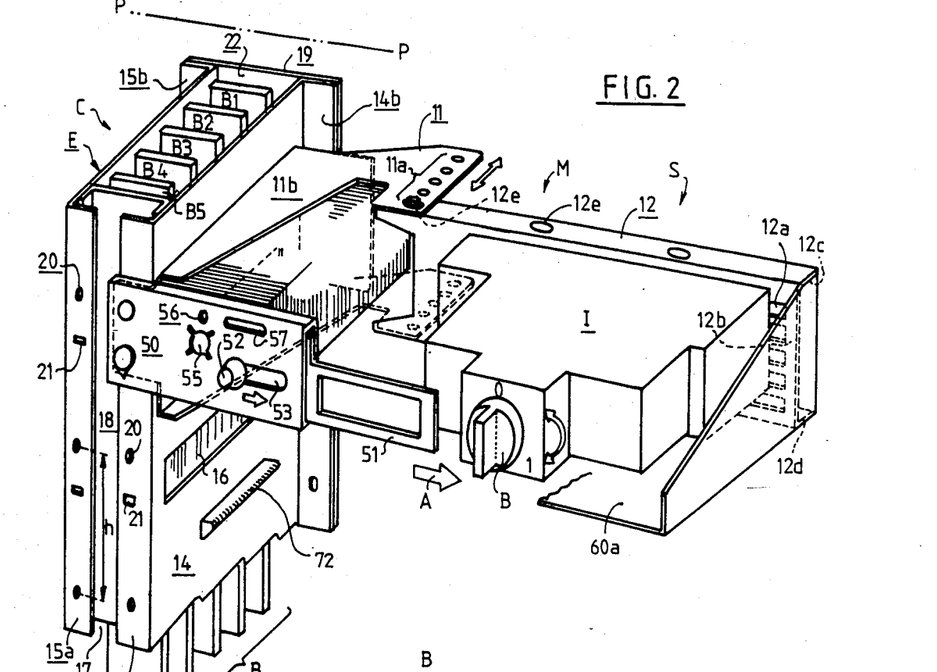
FIG. 2 shows in a perspective view a switching apparatus support fixed to the casing of the distribution column.

The downstream power wiring of the switching apparatus and possible control wiring thereof may be readily gathered together laterally of the modular supports M. The system shown may be installed as a self contained unit or in a distribution cabinet. In a first embodiment, horizontal insulating walls 60a are provided between the different supports M (FIGS. 1 and 2).

In a second embodiment (FIG. 7), each support M is housed in a box 60 comprising a back wall 61, a front wall 62, an upper wall 63 and a lower wall 64, as well as on the side opposite the fixed portion 11 of the support two spacers 65 and 66 and a side wall 67. The rigidity of walls 62, 67 of the box combined with that of support M provides the desired mechanical strength of the assembly. Walls 63 and 64 have hinges 63a, 64a, for a swinging door 68.

Figure 7:
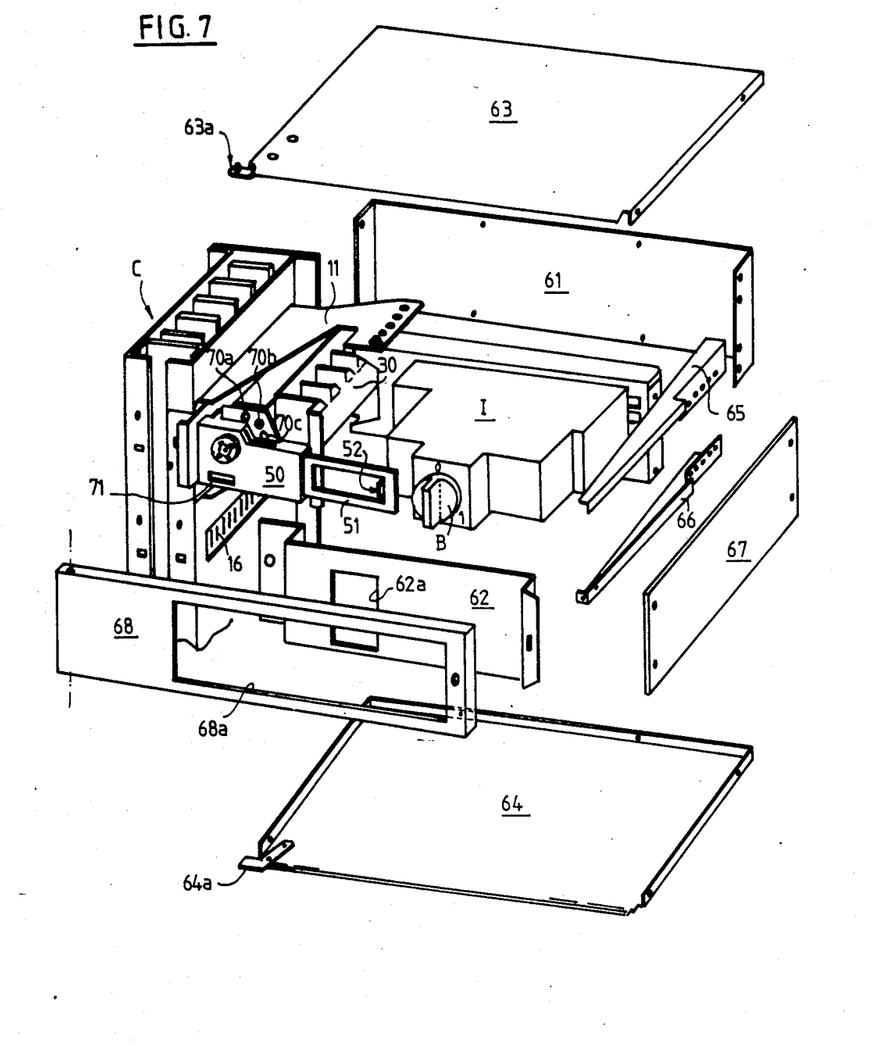
FIG. 7 shows in an exploded pespective view a variant of construction of the support.

The front wall 62 forms an apparatus plate for the switching apparatus and comprises at least one window 62a for passing therethrough the button B of each apparatus, while being shaped and mounted so as to leave the disconnection plate 50 and sensor 51 accessible (FIGS. 7 and 8). Door 68 has an opening 68a for acceding to the button B and to the operating grip 52 of the sensor 51. The sensor further has an aperture for padlocking the sensor in the open position 3 of the switching device; it can thus be seen that the operator may test button B and lock the apparatus in the open state without having to open the door 68, the disconnection block being able to remain clipped in position.

Some walls of the box, for example the lower wall 64, may play the role of cabinet dividing wall. There are further provided in the disconnection plate 50 three apertures 70a, 70b, 70c coinciding in the disconnection position of block 30 with three corresponding apertures in the cylinder 40 or in the slide for a "three padlock" type of locking of the block.

In the lower part of the disconnection plate 50 shown at the bottom of FIG. 8 may be seen a window 71 by which the operator can check effective breaking by means of indicator means connected to the mobile part of block 30 and appearing in this window in the disconnection position.

In FIG. 9, a padlock 73 has been shown engaged in an aperture 40a of the cylinder 40 and in a corresponding aperture 70 of the disconnection plate 50. Plate 50 has in its rear portion a facet 50a which hides a screw not shown for fixing the apparatus plate 62 to the support. Plate 50 is retractable, for example by pivoting about a pin 50b by releasing the fixing screw. It will thus be understood that action on the switching device I or removal thereof can only take place after the disconnection plate 50 has been pivoted for removing the apparatus plate 62. In addition, the plate 50 can only pivot into the open position 50c in the disconnection position of the mobile part of block 30; cooperating portions are provided for this purpose on the plate and on the mobile part, for example cylinder 40, of the block 30 for preventing the plate 50 from being opened in the clipped on position.

Figure 10:
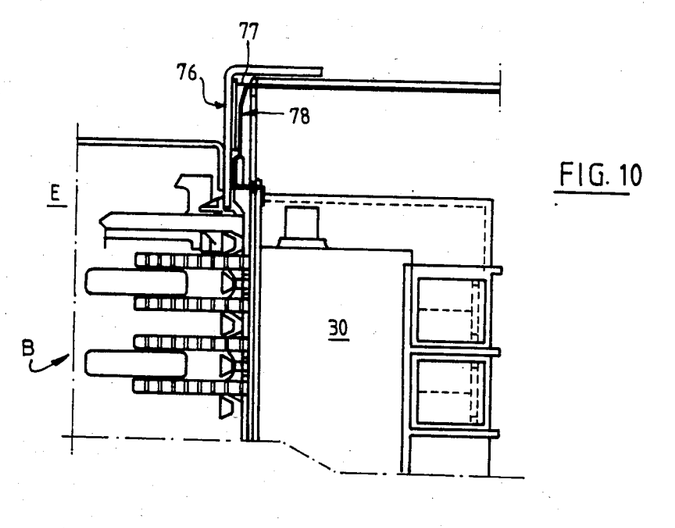
FIG. 10 shows a partial top view of a variant of construction of the column and of the disconnecting block.

Case E of the distribution column illustrated in FIG. 10 houses several bars B and has, on its rear outer part, an added angle iron 76. To this angle iron is fixed on the disconnection block 30 side a flat protective conductor 77; this conductor 77 is disposed optionally and is placed in contact in the clipped on position of block 30 with a resilient conducting piece 78 provided on the block.

The above described distribution system operates as follows.

With the distribution column C mounted in the open air or in a casing, for example a cabinet, the operator who desires to dispose on the column a lateral modular support M positions this support horizontally for engaging the tenons 11h and locking pieces 11i in the respective apertures 20, 21 of the front 14a, 15a, and rear 14b, 15b flanges of case E, whereas the support is held applied against projections 72 then he fixes the support by locking the quarter of a turn piece 11i.

For a disconnection operation, the operator grips the button or grip 52 and moves the sensor 51 in the direction of arrow A (FIGS. 2 and 4) until the end of the sensor abuts against the button B of the switching apparatus I.

If the sensor detects the position 3, i.e. the "open" or "off" position of the apparatus (FIG. 2), the operator may fit the key controlling the disconnection into the slotted aperture 55 and into the corresponding coaxial housing 43 of cylinder 40, the respective slots of the aperture and of the housing being aligned. By turning the key, the operator then causes the shaft to pivot and slide 32 to move. The contact 42 is actuated by the rearward movement of cylinder 40 against the return spring 41 when the operator introduces the key. The operator may then without risk actuate the switching apparatus and check the auxiliary devices thereof.

When, after disconnection, the operator desires to reconnect the slide 32, he cannot effect this operation if the switching apparatus I is in the "on" position, since hereagain the insufficient travel of the sensor prevents the key from being inserted.

It goes without saying that modifications may be made to the embodiment described without departing from the scope and spirit of the invention. It should be noted that the system described offers safety during assembly and disassembly operations carried out on supports 11 of column C. Because the engagement/disengagement direction of the supports 11 is perpendicular to the clipping-unclipping direction of the disconnection block 30, it is impossible, when the mobile part of block 30 is in the withdrawn position, to engage support 11 on the column or, when the support is mounted on the column, to disengage it therefrom.

What is claimed is

1. A distribution system for electric switching apparatus, comprising:
   (i) a distribution column having a plurality of vertical bus bars centered in respective parallel vertical planes, and a protective case disposed about the bars, said protective case being of generally rectangular cross-section and having front and rear short sides parallel to said planes and left and right long sides at right angles with said planes, at least the right long side being provided with a plurality of regularly distributed first openings and the rear short side being outwardly extended by at least one fixing wing, while the front short side forms at least one inwardly directed fixing wing, said fixing wings being each provided with regularly distributed apertures;
   (ii) a plurality of removable elongated supports which extend laterally to the protective casing and are each adapted for supporting at least one switching apparatus and current tapping and disconnecting means, said current tapping and disconnecting means being mounted on a first portion of the elongated support having front and rear parallel walls and a web joining said walls at right angles thereto, said web being provided with a second opening and means cooperating with said openings for removably securing said front and rear walls respectively onto said inwardly and outwardly directed fixing wings when said web is applied on said right long side with said second opening registering with one first opening of said right long side;
   (iii) said current tapping and disconnecting means having clips clippable on the bus bars by introducing them through said first and second openings, means for establishing an electrical connection to the switching apparatus and a disconnecting part movable with respect to said first portion and adapted to be actuated by manual control means for disconnecting the clips along a direction parallel to said planes from the bus bars.

2. The system as claimed in claim 1, wherein said switching apparatus is mounted on a second portion of the elongated support, the first portion further comprises at least one horizontal face having regularly distributed perforations aligned in a direction parallel to said web and means, cooperating with said perforations for securing the second portion to the first portion in a position which is adjustable along said direction.

3. The system as claimed in claim 2, wherein said first portion has upper and lower horizontal faces and a plurality of projections adapted for supporting the lower horizontal faces of the first portions of the respective elongated supports are formed on said right long side.

4. The system as claimed in claim 1, further comprising a purality of boxes each having a front plate and a pivoting door, wherein the respective elongated supports and the associated current tapping and disconnecting means are enclosed in the respective boxes of said plurality.

5. A distribution system for electric switching apparatus, comprising:
   (i) a distribution column having a plurality of vertical bus bars centered in respective parallel vertical planes, and a protective case disposed about the bars, said protective case being of generally rectangular cross-section and having front and rear short sides parallel to said planes and left and right long sides at right angles to said planes, at least the right long side being provided with a plurality of regularly distributed openings;
   (ii) a plurality of removable elongated supports which extend laterally to the protective casing and are each adapted for supporting at least one switching apparatus and current tapping and disconnecting means, said current tapping and disconnecting means being mounted on a first portion of the elongated support having a web provided with a second opening and means for removably securing said first portion onto said protecting casing when said web is applied on said right long side with said second opening registering with one first opening of said right long side;
   (iii) said current tapping and disconnecting means having clips clippable on the bus bars by introducing them through said first and second openings, each for establishing an electrical connection to the switching apparatus and a disconecting part movable with respect to said first portion and adapted to be actuated by manual control means for disconnecting the clips from the bus bars along a direction parallel to said planes, said switching apparatus being mounted on a second portion of the elongated support, the first portion further comprising at least one horizontal face having regularly distributed perforations aligned in a direction parallel to said web and means, cooperating with said perforations, for securing the second portion to the first portion in a position which is adjustable along said direction, the switching apparatus having further manual control means and said manual control means and further manual control means being located in front of the plane of the front short side of the protective case.

6. The distribution system as claimed in claim 5, wherein the second portion of the elongated support comprises a platen having evenly spaced further perforations aligned in a further direction parallel to said planes and means, cooperating with said further perforations, for securing a switching apparatus to said platen in a position which is adjustable along said further direction.

7. The system as claimed in claim 6, wherein the said platen supports, by means of telescopic lugs, a plurality of horizontal rails for supporting modular switching apparatus.

8. The system as claimed in claim 5, wherein said disconnecting part comprises a slide the translational movement of which is caused by the rotation of a rotary shaft controlled by the manual control means.

9. The system as claimed in claim 9, wherein said manual control means comprise a disconnection plate provided with a front slotted aperture, a rotary cylinder which comprises a slotted housing coaxial with said slotted aperture and which is interlocked for rotation with said rotary shaft, the slots of the aperture of the disconnecting plate and of the housing of the cylinder being adapted to receive an operating key and only registering in a connection position and in a disconnection position.

10. The system as claimed in claim 5, wherein said current tapping and disconnecting means comprises an elongated sensor having a free end, manual grip means for displacing said sensor in a direction parallel to the plane of said front short side until said free end engages said further manual control means of the switching apparatus, and said sensor is arranged for cooperating with said rotary shaft to prevent disconnection and reconnection when the sensor detects that said further manual control means are in an "on" position.

11. The system as claimed in claim 5, wherein said first portion and said disconnecting part of the current tapping and disconnection means each have at least one aperture, which apertures are opposite each other in a disconnecting position so as to allow the insertion of a padlock.

12. The system as claimed in claim 10, wherein the sensor has an aperture for introducing a padlock for locking the shaft from rotation when the sensor is in its position where it detects an "off" position of the further manual control means.

13. The system as claimed in claim 9, wherein said rotary cylinder of the current tapping and disconnecting means is mounted for translational movement on the rotary shaft while being urged by a return spring, the rotary cylinder being caused to move against the force of the return spring during manual control of the disconnection, and a contact responsive to the movement of the cylinder along the axis of the shaft.

* * * * *